United States Patent
Fujisawa

[15] 3,705,761
[45] Dec. 12, 1972

[54] ADJUSTABLE TEMPLE FOR EYEGLASSES

[72] Inventor: Masakatsu Fujisawa, San Francisco, Calif.

[73] Assignee: American Safety Equipment Corporation, Encino, Calif.

[22] Filed: Feb. 16, 1971

[21] Appl. No.: 115,583

[52] U.S. Cl. ................................. 351/118, 351/119
[51] Int. Cl. ............................................... G02c 5/20
[58] Field of Search ........ 351/118, 119, 19; 267/58 T

[56] References Cited

UNITED STATES PATENTS

| 1,910,743 | 5/1933 | Bouchard | 351/19 |
| 3,545,848 | 12/1970 | Sebastian | 351/118 |
| 3,318,654 | 5/1967 | Kreuzberger et al. | 351/118 |

Primary Examiner—David Schonberg
Assistant Examiner—Robert L. Sherman
Attorney—Miketta, Glenny, Poms & Smith

[57] ABSTRACT

The adjustable temple for eyeglasses has a transversely notched front portion of an ear contoured part telescoped into a rearwardly open ended cavity portion of a forward part, and releasably locking member slidably positioned in a transverse open ended compartment in the forward part and in communication with the cavity portion, the locking member integrally including a detent shoulder, a spring member and an actuator end, whereby manual actuation of the actuator end moves the detent shoulder out of the notch against the action of the spring member, permitting manual longitudinal adjustment of the parts to fit different head sizes, and on release of the actuator end, the spring member forces the detent shoulder into an aligned notch to lock the parts together, providing individually adjusted eyeglasses.

5 Claims, 7 Drawing Figures

PATENTED DEC 12 1972
3,705,761
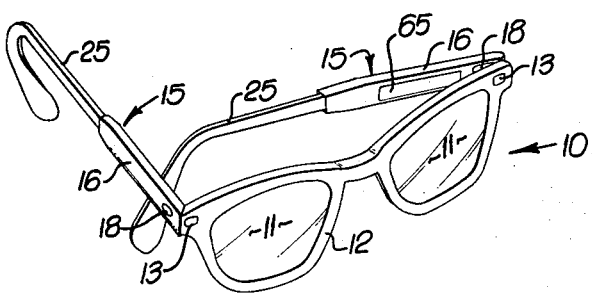
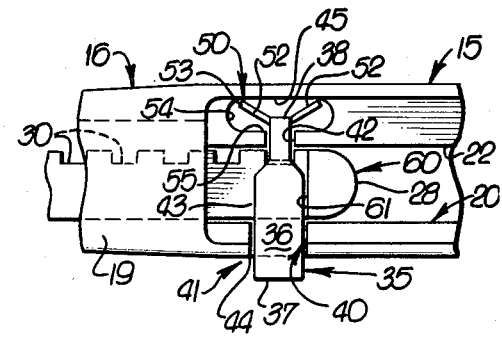
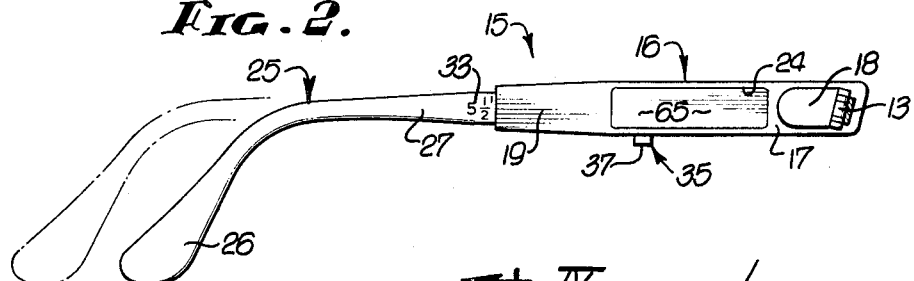
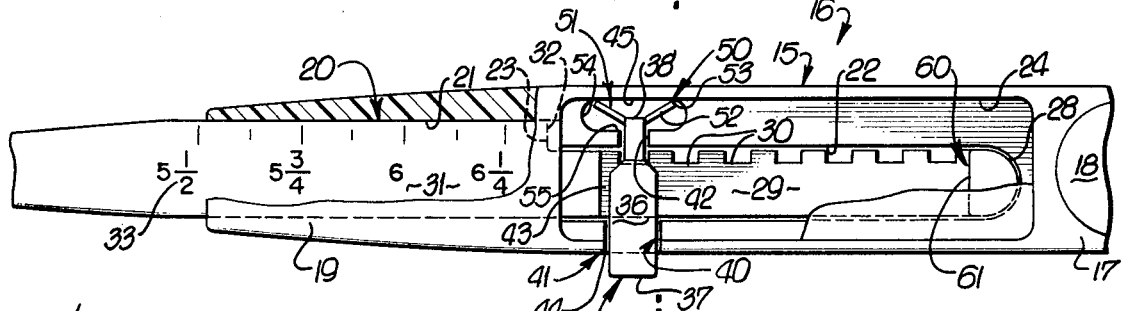
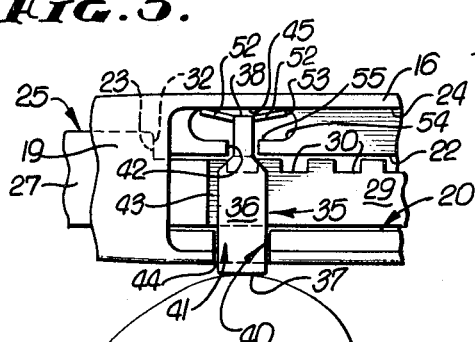
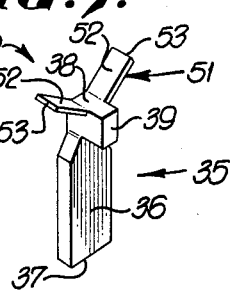
INVENTOR.
MASAKATSU FUJISAWA
BY
Miketta, Glenny, Poms & Smith
ATTORNEYS.

3,705,761

ADJUSTABLE TEMPLE FOR EYEGLASSES

BACKGROUND OF THE INVENTION:

This invention relates to eyeglass frame temples and more particularly to extendable or two-part type temples.

There are patents which show adjustable length temples for use in eyeglass frames. Anderson U.S. Pat. No. 3,133,141 for example shows such a temple with a forward part into which is slid a bifurcated ear contoured rear part adapted to be secured to the forward part by screws. Berend U.S. Pat. No. 3,052,161 and Magnus U.S. Pat. No. 3,261,652 are also examples of such a temple with a forward part, into which is slid an ear contoured rear part, with the parts having a cooperating rack and spring detent to secure the two parts together, until sufficient force is applied to slide the detent to another position on the rack.

The object of most of these prior art patents is to produce a universal or nearly universal eyeglass frame which will fit all head sizes. Such glasses are preferably for use as industrial safety glasses but may also be used with prescription lenses. In many industries the wearing of safety glasses is either required by law or is a desirable practice for preventing eye injuries. Usually an employer will supply the safety glasses to all of his employees, thus requiring the employer to maintain a large inventory of safety glasses in all sizes. If an acceptable universal temple could be provided for such safety glasses, the inventory of safety glasses carried by each employer could be substantially reduced, thus providing a savings in money and storage space. Moreover, self-adjustable, universal type safety glasses would be convenient and readily accessible to all employees, thus encouraging their use.

Another important use for safety glasses with adjustable temples would be for issuing to visitors, upon their entry into a plant or other facility, where the use of safety glasses is required or desirable. In such situations, safety glasses, of all sizes, are usually kept at a guard station and are issued to each visitor. These safety glasses are to be returned to the guard station by the visitor before leaving the plant. These same glasses are then reissued to another visitor and so on. Glasses, with adjustable temples, for such use, must not only fit all head sizes, but also must be quickly, simply, and easily adjustable, without any explanation as to how the needed adjustment is accomplished.

With prior art patents showing adjustable temples for use in glasses frames, why are not the above described needs satisfied by these existing designs? The reasons why such a need still exists, is found by examining the advantages and disadvantages of each design. Upon such examination, every prior art design has a major disadvantage. Many designs are too costly to manufacture and assemble at a salable figure. Other designs require or produce temples which are too bulky to be comfortable, or which are not of sufficient rigidity to remain in place. Still other designs of adjustable temples are not strong enough, or stable enough, once adjusted, to withstand normal stress on the temples without wobbling or changing their adjustment. Thus there is still a need for a novel and practical adjustable temple for eyeglasses.

BACKGROUND OF THE INVENTION

Therefore, it is a primary object of this invention to provide a novel and practical adjustable temple for eyeglasses which overcomes the problems and disadvantages of known adjustable temples.

Other and additional objects of this invention are to provide such a temple which is simple and inexpensive to manufacture, easy to assemble, and aesthetically pleasing to the eye once assembled; to provide such a temple which is easily adjustable between several positions to comfortably fit most persons; to provide such a temple which once adjusted will remain in this position under normal stress without the temple wobbling excessively; to provide such a temple which may be easily readjusted to correct any discomfort caused by the original adjustment, or to fit another wearer; to provide such a temple that will allow a single pair of eyeglasses to be universally worn by different persons with minor adjustments and to provide such a temple which when properly adjusted will make the glasses comfortable to wear so that the glasses will be worn and not discarded at the first opportunity.

Generally the adjustable temple for eyeglass frames includes a forward part slidably connected to an ear contoured part for longitudinal movement to adjust to different head sizes, with the improvement according to this invention including the provision of a locking member positioned on one part and adapted to lockingly engage the other part and means mounting the one part for slidably mounting the locking member on the one part for movement between a locked position and release position. The locking member may be biased to the locked position and securely held in such position by a spring. The locking member may integrally include a body with an actuator end, a detent shoulder and a spring member. The mounting means may be an open ended compartment in a first of the parts for slidably mounting the locking member with an actuator end protruding out of the compartment. Cooperating stop means such as mating shoulders or a lip engaging the locking member may be provided for preventing separation of the parts. A two-part cavity may be provided to provide larger and smaller mating sections for a minimum of wobble between the members. A cover may be provided for closing the cutout.

BRIEF DESCRIPTION OF THE DRAWINGS

FIG. 1 is a perspective view of a pair of glasses having the adjustable temple, according to this invention;

FIG. 2 is an enlarged side elevational view of the temple of FIG. 1, with the ear contoured part thereof being shown, in solid lines, in a contracted position and, in phantom lines, in an extended position;

FIG. 3 is an enlarged, fragmentary, side elevational view of a portion of FIG. 2, showing the cooperation of the forward part, the ear contoured part and the locking member, with the locking member being shown in a locked position;

FIG. 4 is a cross-sectional view taken along the plane IV—IV of FIG. 3, showing the detent shoulder of the locking member located in an aligned notch of the ear contoured part;

FIG. 5 is a fragmentary side elevational view of a portion of FIG. 3 but showing the locking member in a release position;

FIG. 6 is a fragmentary, side elevational view of a portion of FIG. 3, but showing the ear contoured part in the extended position with a lip thereon engaging the locking member; and FIG. 7 is a perspective view of the locking member for use in the adjustable temple, according to this invention.

DETAILED DESCRIPTION OF THE PREFERRED EMBODIMENTS

Referring now to the drawings and particularly to FIG. 1, a pair of eyeglasses 10 have lens 11 mounted in a front frame 12. On either side of the front frame 12 is a hinge half 13 for pivotally mounting a temple. Thus far the eyeglasses 10 are of conventional design but may be adapted for universal use, by the provision of an adjustable temple 15 according to this invention.

Generally the adjustable temple 15 according to this invention includes a forward part 16 slidably connected to an ear contoured part 25 with the parts 16 and 25 being adapted to be longitudinally moved relative to each other for adjustment to different head sizes, a locking member 35 transversely positioned on one part and adapted to lockingly engage the other part, mounting means 40 for slidably mounting the locking member 35 on the one part for movement between a locked position and a release position. Biasing means 50 may be provided for biasing the locking member 35 to the locked position, and cooperating stop means 60 may be provided for preventing the parts 16 and 25 from separating.

Referring now to FIG. 2, the temple 15 having a forward part 16 and an ear contoured part 25 is shown in solid lines in a contracted position, and in phantom lines, in an extended position, and is positionable in a multiplicity of positions between these extreme positions to fit all head sizes. It is contemplated that the parts 16 and 25 will be molded of a plastic or other material which matches the plastic or other material of the front frame 12.

The forward member 16 has a front end 17, adjacent which is mounted to a hinge member 18 for mating with the hinge member 13 on the front frame 12 and receiving the pivot pin therethrough to pivotally mount the forward member 16 to frame 12. As best seen in FIG. 3, the forward part 16 also includes a rear or other end 19 having a longitudinal elongated open ended cavity 20 extending forwardly from the end 19 and into the part 16. The elongated cavity 20 has a rear cavity portion 21 and a forward smaller cavity portion 22 with a first shoulder 23 separating the two cavity portions 21 and 22 for a purpose which will appear later. The middle of the forward part 15 is provided with a side or an inwardly opening cutout 24 to provide access to the forward small cavity 22.

The ear contoured part 25 is seen in FIG. 2 and includes an ear contoured portion 26. As best seen in FIG. 3, a forwardly extending portion 27 of the part 25 is joined to the ear contoured portion and extends forwardly therefrom until terminating at a front or other end 28. Adjacent the front end 28, is a smaller portion 29 having a plurality of transversely, upwardly opening notches 30. The forwardly extending portion 27 is completed by a larger portion 31 with a second shoulder 32 between the portions 29 and 31. The cross sectional dimensions of the smaller portion 29 and larger portion 31 are substantially the same as the cross sectional dimensions of the smaller cavity portion 22 and larger cavity portion 21, respectively, for slidably mating therewith upon assembly. The larger portion is provided with indica 33 along its inwardly facing side, consisting of a plurality of lines with corresponding numbers associated therewith.

Upon insertion of the ear contoured part 25 into the cavity 20 of the forward part 16, the smaller portion 29 extends into the forward smaller cavity portion 22 and the larger portion 31 extends into the rear larger cavity portion 21 to be matingly and snugly received therein. Thus the parts 16 and 25 are telescopically joined in a positive manner for longitudinal movement for adjustment to different head sizes. The longitudinal movement is between a contracted position shown in FIG. 3 in solid lines, and an extended position shown in FIG. 3 in phantom lines, to selected positions therebetween.

Referring now to FIG. 7, the releasable elongated locking member 35 has an elongated body 36 with a lower actuator end 37 and an opposite narrow end 38 merging into a detent shoulder 39. The locking member 35 is preferably molded of a suitable plastic which has a high resilience to deformation for a purpose which will appear later.

The mounting means 40 for slidably mounting the locking member 35 as best seen in FIGS. 4 and 5, includes a transversely extending compartment 41 having spaced walls 42 for guiding the sliding movement of the locking member 35. Between the walls 42 is an opening 43 communicating the compartment 41 with the cavity 20. The lower end 44 of compartment 41 is open to the lower surface of the forward part 16 while the upper end 45 is closed. The locking member 35 in the compartment 41 is slidable between a locked position, as shown in FIG. 4, wherein the actuator end 37 protrudes from the open end 44 to be exposed, the detent shoulder 39 extends into the cavity 20, and into a selected notch 30, and the narrow end 38, is spaced from the closed end 45; and a release position, as shown in FIG. 5, wherein the actuator end 37 is nearly flush with the open end 44 of the compartment 41, the detent shoulder 39 is spaced above the cavity 20 and the notches 30, and the narrow end 38 is against the closed end 45 of the compartment 41, whereby the ears 52 are compressed into an open position. In the locked position, the detent shoulder extends into an aligned notch 30 to hold the parts 16 and 25 from longitudinal movement and in the released position the detent shoulder is spaced above an aligned notch 30 to permit relative longitudinal movement of the parts 16 and 25 between positions of adjustment.

Biasing means 50 is provided for biasing the locking member 35 to a locked position. The biasing means includes the vertical orientation of the locking member 35 as well as best seen in FIG. 3, a spring member 51 integrally formed with the locking member 35. The spring member 51 has opposed ears 52 which in a free state, as seen in FIG. 6, are V-ed with the outer ends 53 spread apart. The compartment 41 is provided with enlargements 54 for receiving these ears 52 with the lower surfaces thereof engaging the lower edges 55 of the enlargement 54 to prevent the locking member 35 from dropping out of the compartment 41. The resilience of the opposed V-ears 52 biases the locking member 35 to the locked position as shown in FIG. 3, and, as seen in FIG. 5, pressure on the actuator end 37 of the locking member 35 must overcome the resilience of the ears 41 to slide the locking member 35 to the unlocked position. Upon release of the actuator end 37, the ears 52 of the biasing means 50, will force the locking member 35 to return to the locked position.

The cooperating stop means 60 includes the first and second shoulders 23 and 32 which as seen in FIG. 3 engage in the contracted position of the parts 16 and 25. The cooperating stop means 60 also includes a lip 61 adjacent the end of the part 25. As seen in FIG. 6, the lip 61 will engage the body 36 of the locking member 35 in the extended position of the part 16 and 25 to prevent the parts 16 and 25 from separating.

The temple 15 is completed by the provision of a cover 65 for covering the cutout 24. The cover 65 is sized to mate with the cutout 24 when received therein, and will provide a smooth inwardly facing surface to the forward part 16. Any suitable means may be used to secure that cover 65 in the cutout 24 such as an adhesive.

The steps of assembly of the temple 15 according to this invention are very simple. The rear part 25 is inserted into the elongated cavity 20 of the forward part 16, until one of the notches 30 is aligned with the compartment 41, the locking member 35 is inserted through the cutout 24 into compartment 41, and the cover 65 is secured in the cutout 24 to hold the locking member 35 in the compartment 41 and the rear part 25 in the cavity 20. The temple 15 then has a hinge member 18 thereof inserted into the hinge member 13 of the front frame 12 and a pin inserted therein to pivotally mount the adjustable temple 15 to the frame 12.

To adjust the temple 15 according to this invention, the actuator end 37 of the locking member 35 is pressed upwardly against the biasing of the ears 52 to slide the locking member 35 upwardly and to move the detent shoulder 39 from an aligned notch 30 and into the unlocked position as shown in FIG. 5. The ear contoured part 25 is now free to be longitudinally moved to a proper position to fit the intended wearers head. When the ear contoured part 25 is properly positioned, the locking member 35 is released, whereupon the resilience of ears 52 forces the locking member 35 downwardly into the locking position, as shown in FIG. 3, whereby the detent shoulder 39 is moved into an aligned notch 30 to prevent longitudinal sliding movement between the member 16 and 20. The member 16 and 20 are held in this adjusted position to provide the proper length temple for the individual wearer. If readjustment is necessary, the steps are merely repeated. When the temple is correctly adjusted, the wearer can observe the number of the indica 33 to enable him to quickly adjust the temple to the proper size when such glasses are worn again. While the ear contoured part 25 of the illustrative adjustable temple is telescoped into the forward part 16, the forward part 16 could be telescoped into the ear contoured part 25 and this construction is well within this invention. Also, the parts 16 and 25 could be slidably mounted along side each other or a third member to obtain the desired relative longitudinal movement between these parts, which is again well within the scope of this invention. Likewise by suitable changes in parts 16 and 25, the locking member 35 could be mounted to part 25 for lockingly engaging part 16 and still be within this invention.

Thus, the adjustable temple according to this invention for eyeglasses is easily adjustable between several positions to fit all persons and yet is simple and inexpensive to manufacture and assemble.

I claim:

1. In an adjustable length temple construction for eyeglasses frames having a forward part slidably connected to a rearward ear contoured part with releasable locking means therebetween, the improvement comprising the provision of:

cavity means in said forward part for receiving forward portions of said ear contoured part, said cavity means including a first outer cavity portion of a first cross sectional size and a second inner cavity portion of a reduced second cross sectional size smaller than said first cross sectional size, said forward part having an inner abutment shoulder formed by an inner end wall of said outer cavity portion adjacent said inner cavity portion; and mating means on forward portions of said ear contoured part including a reduced forward end portion for fitting into said second inner cavity portion with rearwardly adjacent forward portions of nonreduced dimensions fitting into said first outer cavity, said reduced and adjacent portions forming a stop shoulder therebetween said mating means being provided with a rearwardly facing lip adjacent the outer end of said reduced forward end portion, and stop means provided on said temple forward part for engaging said lip on outward withdrawal of said ear contoured part relative to said forward part to thereby prevent separation of said parts during relative adjustment thereof; whereby on assembly of said ear contoured forward portions into said temple forward part cavity portions a mating engagement is obtained therebetween over two distinct differently sized cavity portions and mating forward portions of said respective temple parts, inward telescoping movement of said ear contoured part relative to said forward part being positively limited by abutment of said stop shoulder against said abutment shoulder.

2. The improvement in adjustable length temple construction of claim 20 wherein:

said mating means reduced forward end portion of said ear contoured part is provided with a plurality of notches in a side thereof;

said stop means includes a movable actuator means including a detent shoulder for engagement with any of said notches to hold said temple parts in selected positions of adjustment between the inner and outer limits of adjustment provided by said stop and abutment shoulders and lip and stop means, respectively, and mounting means for mounting said movable actuator means on said forward temple part for selective manual movement relative to said ear contoured part.

3. The improvement in adjustable length temple construction of claim 2 wherein:

indicia means are provided on said ear contoured part for providing a visually observable indication thereon as to the position of relative adjustment of said parts.

4. The improvement in adjustable length temple construction of claim 2 wherein:

said movable actuator means comprises a one piece combination detent, spring and actuator means including a body portion having integrally formed actuator end, detent shoulder and spring arm positions, and said mounting means includes means for mounting said body portion for sliding movement in said ear contoured part transversely of said forward part reduced forward end with said spring arm portion abutting adjacent portions of said ear contoured part to normally bias said detent shoulder portion into locking engagement with one said notches, said actuator means being manually movable against the bias of said integral spring arm portion to move said detent shoulder portion out of engagement with said notches to allow adjustment of said ear contoured part relative to said temple forward part.

5. In an adjustable length temple for eyeglass frames having a forward part slidably connected to a rearward ear contoured part with releasable locking means, including notches associated with one of said members, for holding said parts in a desired temple length, the improvement in locking means comprising:

a one piece combination detent, spring and actuator means for releasable locking said parts against relative sliding movement including a body portion, an actuator end portion, a detent shoulder portion protruding from said body portion and spaced from said actuator end portion and at least one spring arm portion extending outwardly of said body portion; and mounting means on one of said temple parts for mounting said body portion for sliding movement into and out of locking engagement of said detent shoulder portion and any of said notches with said actuator end portion protruding outwardly of and said arm portion abutting against said one of said temple parts whereby said actuator means is normally biased into locking engagement with the other of said temple parts.

* * * * *